(12) United States Patent
Wang et al.

(10) Patent No.: US 10,970,528 B2
(45) Date of Patent: Apr. 6, 2021

(54) METHOD FOR HUMAN MOTION ANALYSIS, APPARATUS FOR HUMAN MOTION ANALYSIS, DEVICE AND STORAGE MEDIUM

(71) Applicant: BAIDU ONLINE NETWORK TECHNOLOGY (BEIJING) CO., LTD., Beijing (CN)

(72) Inventors: Jian Wang, Beijing (CN); Xubin Li, Beijing (CN); Le Kang, Sunnyvale, CA (US); Zeyu Liu, Beijing (CN); Zhizhen Chi, Beijing (CN); Chengyue Zhang, Beijing (CN); Xiao Liu, Beijing (CN); Hao Sun, Beijing (CN); Shilei Wen, Beijing (CN); Yingze Bao, Sunnyvale, CA (US); Mingyu Chen, Beijing (CN); Errui Ding, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 0 days.

(21) Appl. No.: 16/459,890

(22) Filed: Jul. 2, 2019

(65) Prior Publication Data
US 2019/0325207 A1 Oct. 24, 2019

(30) Foreign Application Priority Data
Jul. 3, 2018 (CN) .......................... 201810720374.9

(51) Int. Cl.
*G06K 9/00* (2006.01)
*G06T 7/292* (2017.01)
(Continued)

(52) U.S. Cl.
CPC ......... *G06K 9/00355* (2013.01); *G01G 19/52* (2013.01); *G01V 8/10* (2013.01);
(Continued)

(58) Field of Classification Search
None
See application file for complete search history.

(56) References Cited

U.S. PATENT DOCUMENTS 9,922,301 B2 *   3/2018  Tanigawa ......... G06Q 10/06393
10,163,115 B2 * 12/2018  Ogawa ............... G06K 9/00335
(Continued)

FOREIGN PATENT DOCUMENTS

| CN | 204305213 U | 4/2015 |
| CN | 104885111 A | 9/2015 |

(Continued)

OTHER PUBLICATIONS

Berman et al., "Sensors for Gesture Recognition Systems," IEEE Trans. on Systems, Man and Cybernetics—Part C: Applications and Reviews, vol. 42, No. 3, May 2012, pp. 277-290 (Year: 2012).*

(Continued)

*Primary Examiner* — Reza Aghevli
(74) *Attorney, Agent, or Firm* — Dilworth IP, LLC

(57) ABSTRACT

A method for human motion analysis, an apparatus for human motion analysis, a device, and a storage medium. The method includes: acquiring image information captured by a number of photographing devices, where at least one of the number of photographing devices is disposed above a shelf; performing human tracking according to the image information captured by the plurality of photographing devices, and determining position information in space of at least one human body and identification information of the at least one human body; acquiring, according to the position information in space of a target human body of the at least one human body, a target image captured by the photographing device above a shelf corresponding to the position information; and recognizing an action of the target human body (Continued)

according to the target image and detection data of a non-visual sensor corresponding to the position information.

10 Claims, 3 Drawing Sheets

(51) Int. Cl.
  *G01G 19/52* (2006.01)
  *G01V 8/10* (2006.01)
  *G06Q 30/02* (2012.01)
(52) U.S. Cl.
  CPC ......... *G06T 7/292* (2017.01); *G06Q 30/0201* (2013.01); *G06T 2207/10048* (2013.01); *G06T 2207/30196* (2013.01)

(56) References Cited

U.S. PATENT DOCUMENTS

| | | | | |
|---|---|---|---|---|
| 10,653,328 | B2* | 5/2020 | Watanabe | A61B 5/7278 |
| 2005/0054910 | A1* | 3/2005 | Tremblay | A61B 5/055 |
| | | | | 600/411 |
| 2011/0310220 | A1* | 12/2011 | McEldowney | G02B 5/1895 |
| | | | | 348/42 |
| 2012/0056982 | A1* | 3/2012 | Katz | G06T 7/521 |
| | | | | 348/43 |
| 2014/0039277 | A1* | 2/2014 | Abraham | A61B 8/4483 |
| | | | | 600/301 |
| 2014/0169623 | A1 | 6/2014 | Liu et al. | |
| 2014/0257047 | A1* | 9/2014 | Sillay | A61B 5/4082 |
| | | | | 600/301 |
| 2015/0003687 | A1* | 1/2015 | Utsunomiya | G06K 9/00342 |
| | | | | 382/107 |
| 2015/0010204 | A1* | 1/2015 | Iwai | G06K 9/00771 |
| | | | | 382/103 |
| 2015/0063640 | A1* | 3/2015 | Anabuki | G06T 7/20 |
| | | | | 382/103 |
| 2015/0193716 | A1* | 7/2015 | Tanigawa | H05B 47/105 |
| | | | | 705/7.39 |
| 2015/0262460 | A1* | 9/2015 | Ito | G08B 13/22 |
| | | | | 340/568.1 |
| 2015/0286853 | A1 | 10/2015 | Shapovalova et al. | |
| 2015/0294481 | A1* | 10/2015 | Sakaue | A61B 5/112 |
| | | | | 382/103 |
| 2015/0348060 | A1* | 12/2015 | Ogawa | G06T 11/206 |
| | | | | 705/7.29 |
| 2016/0142680 | A1* | 5/2016 | Tsunematsu | G06K 9/00342 |
| | | | | 348/159 |
| 2016/0203499 | A1* | 7/2016 | Yamashita | G06Q 30/0201 |
| | | | | 705/7.29 |
| 2016/0210829 | A1 | 7/2016 | Uchida et al. | |
| 2016/0292533 | A1* | 10/2016 | Uchiyama | H04N 13/366 |
| 2016/0335861 | A1* | 11/2016 | Shimura | G08B 13/19663 |
| 2018/0000359 | A1* | 1/2018 | Watanabe | A61B 5/14552 |
| 2018/0101732 | A1* | 4/2018 | Uchiyama | G06K 9/00771 |
| 2019/0130180 | A1* | 5/2019 | Shiraishi | G06Q 10/087 |
| 2019/0143517 | A1* | 5/2019 | Yang | G06N 3/0454 |
| | | | | 700/245 |
| 2019/0371080 | A1* | 12/2019 | Sminchisescu | G06T 19/00 |

FOREIGN PATENT DOCUMENTS

| | | | | |
|---|---|---|---|---|
| CN | 105518734 | A | | 4/2016 |
| CN | 105580040 | A | | 5/2016 |
| CN | 105761423 | A | | 7/2016 |
| CN | 109409175 | A | | 3/2019 |
| CN | 109920180 | A | * 6/2019 | ............... G07G 1/14 |
| JP | 2017033401 | A | | 2/2017 |
| JP | 2017076338 | A | | 4/2017 |
| WO | 2015033577 | A1 | | 3/2015 |
| WO | 2017163909 | A1 | | 9/2017 |
| WO | 2017175707 | A1 | | 10/2017 |

OTHER PUBLICATIONS

Berman et al., "Sensors for Gesture Recognition Systems", IEEE Transactions on Systems, Man, and Cybernetics—Part C: Applications and Reviews, vol. 42, No. 3, May 2012. pp. 277-290.
Extended European Search Report, Application No. EP 19183926.5, dated Dec. 6, 2019, 12 pages.
Japanese Office Action, Application No. 2019-124785, dated Feb. 25, 2020, 4 pages.
First Office Action issued in CN Patent Application No. 201810720374.9 dated Apr. 10, 2020.
Notice of Allowance issued in JP Patent Application No. 2019-124785 dated Jun. 9, 2020.

* cited by examiner

METHOD FOR HUMAN MOTION ANALYSIS, APPARATUS FOR HUMAN MOTION ANALYSIS, DEVICE AND STORAGE MEDIUM

CROSS-REFERENCE TO RELATED APPLICATION

This application claims priority to Chinese Patent Application No. 201810720374.9, filed on Jul. 3, 2018, which is hereby incorporated by reference in its entirety.

FIELD

Embodiments of the present disclosure relate to the field of communication technologies, and in particular, to a method for human motion analysis, an apparatus for human motion analysis, a device, and a storage medium.

BACKGROUND

In the retail scenario, a human motion needs to be analyzed, which specifically relates to human tracking and motion acquisition and recognition involving purchasing behaviors.

In the prior art, the human tracking is performed by a multi-channel camera uniformly arranged, specifically, two-dimensional image information captured by the multi-channel camera is used as a basis of the human tracking, and the human tracking is performed in the two-dimensional image and the position of the human body is determined. However, the human tracking is in accurate in a crowded retail scenario. In addition, the prior art uses a light curtain or an infrared sensor to acquire and recognize actions related to the purchase behaviors, but the position of the hand acquired through the light curtain or the infrared sensor is inaccurate, causing that the human motion cannot be accurately recognized.

SUMMARY

Embodiments of the present disclosure provides a method for human motion analysis, an apparatus for human motion analysis, a device, and a storage medium, so as to improve the accuracy of human tracking and the precision of human motion recognition.

In a first aspect, an embodiment of the present disclosure provides a method for human motion analysis, including:

acquiring image information captured by a plurality of photographing devices, where at least one of the plurality of photographing devices is disposed above a shelf;

performing human tracking according to the image information captured by the plurality of photographing devices, and determining position information in space of at least one human body and identification information of the at least one human body;

acquiring, according to the position information in space of a target human body of the at least one human body, a target image captured by the photographing device above a shelf corresponding to the position information; and recognizing an action of the target human body according to the target image and detection data of a non-visual sensor corresponding to the position information.

In a second aspect, an embodiment of the present disclosure provides an apparatus for human motion analysis, including:

a first acquisition module, configured to acquire image information captured by a plurality of photographing devices, where at least one of the plurality of photographing devices is disposed above a shelf;

a determination module, configured to perform human tracking according to the image information captured by the plurality of photographing devices, and determine position information in space of at least one human body and identification information of the at least one human body;

a second acquisition module, configured to acquire, according to the position information in space of a target human body of the at least one human body, a target image captured by the photographing device above a shelf corresponding to the position information; and a recognition module, configured to recognize an action of the target human body according to the target image and detection data of a non-visual sensor corresponding to the position information.

In a third aspect, an embodiment of the present disclosure provides a device, including:

a memory;
a processor; and
a computer program;
where the computer program is stored in the memory and configured to be executed by the processor to implement the method of the first aspect.

In a fourth aspect, an embodiment of the present disclosure provides a computer readable storage medium, having a computer program stored thereon, where the computer program, when executed by a processor, implements the method of the first aspect.

In the method for human motion analysis, the apparatus for human motion analysis, the device, and the storage medium according to the embodiments of the present disclosure, image information captured by a plurality of photographing devices is acquired, and the human tracking is performed according to the image information captured by the plurality of photographing devices, where at least one of the plurality of photographing devices is disposed above a shelf, and since the photographing device above the shelf can capture the human body in front of the shelf more completely, the accuracy of the human tracking is improved; in addition, human motion recognition is performed by combining the image information captured by the photographing device above the shelf and the detection data of a non-visual sensor surrounding the human body, thereby improving the precision of the human motion recognition.

The embodiments of the present disclosure have been shown explicitly by the drawings described above, and will be described in more detail below. These drawings and descriptions are not intended to limit the scope of the ideas disclosed by the present disclosure in any way, but rather to illustrate the concept disclosed by the present disclosure for those skilled in the art by reference to the specific embodiments.

DETAILED DESCRIPTION OF EMBODIMENTS

Exemplary embodiments will be described in detail herein, and examples thereof are illustrated in drawings. When the following description relates to the drawings, unless otherwise indicated, the same number in different drawings represents the same or similar elements. Implementations described in following exemplary embodiments do not represent all implementations consistent with the present disclosure. Instead, they are merely examples of apparatuses and methods consistent with some aspects of the present disclosure as described in detail in the appended claims.

Figure 1:
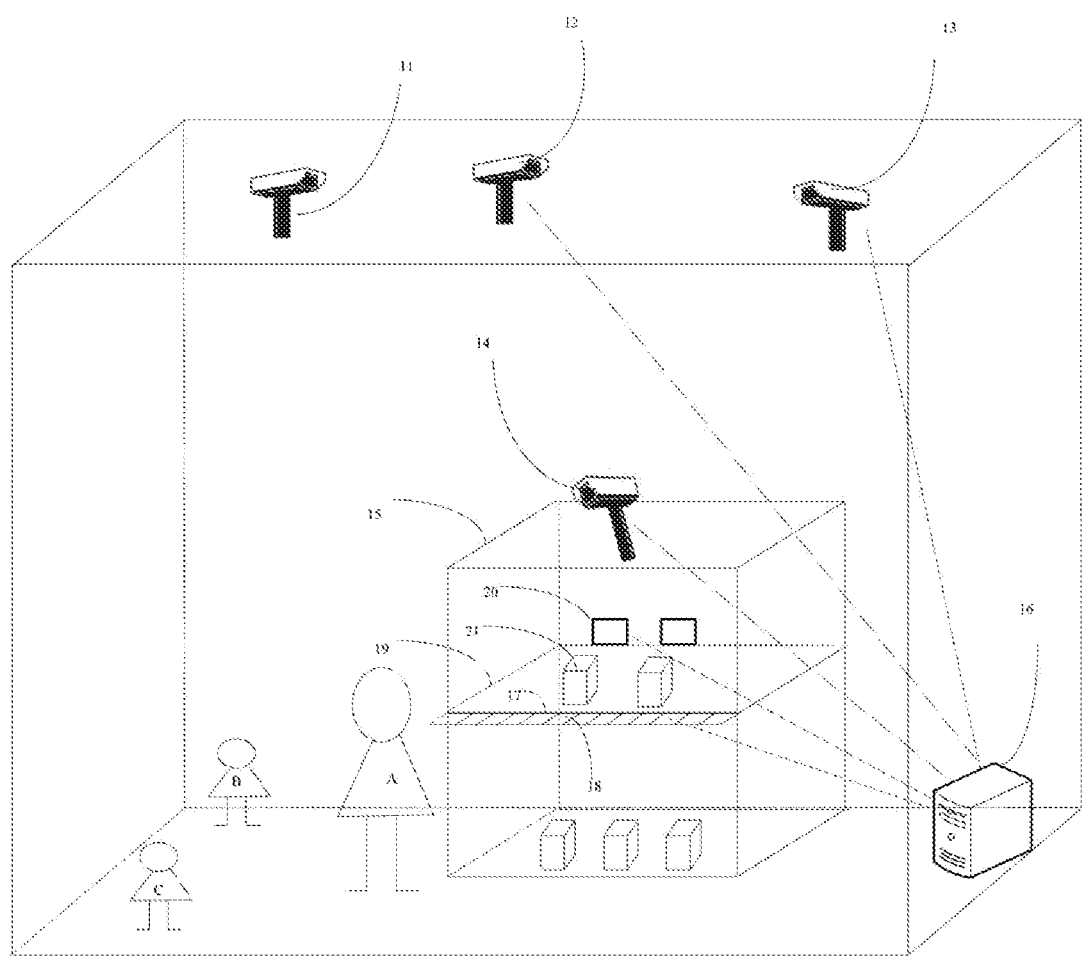
FIG. 1 is a schematic diagram of an application scenario according to an embodiment of the present disclosure.

The method for human motion analysis according to the present disclosure can be applied to the application scenario shown in FIG. 1. As shown in FIG. 1, the application scenario may specifically be a retail scenario, such as a supermarket and a shopping mall. As shown in FIG. 1, the application scenario includes a plurality of photographing devices, such as a photographing device 11, a photographing device 12, a photographing device 13, and a photographing device 14. The photographing device 11, the photographing device 12, and the photographing device 13 may be disposed at the top of a store, and the photographing device 14 may be disposed above a shelf 15. In addition, the application scenario further includes a device 16 having data processing and image processing functions, and the device 16 may be a local terminal device of the store, such as a computer, or a remote server. The device 16 can receive image information captured by the photographing device 11, the photographing device 12, the photographing device 13, and the photographing device 14. In addition, a non-visual sensor may be disposed on the shelf 15, such as a light curtain sensor 18 disposed on a beam 17 of the shelf 15, an infrared sensor 20 disposed on a layer plate 19 of the shelf 15, and the device 16 may acquire the detection data of the non-visual sensor. Optionally, the photographing device and the non-visual sensor can be wired or wirelessly connected to the device 16.

The method for human motion analysis according to the present disclosure aims to solve the above technical problems of the prior art.

The technical solutions of the present disclosure and how the technical solutions of the present application solve the above technical problems will be described in detail below with reference to specific embodiments. The following specific embodiments may be combined with each other, and the same or similar concepts or processes may not be repeated in some embodiments. The embodiments of the present disclosure will be described below with reference to drawings.

Figure 2:
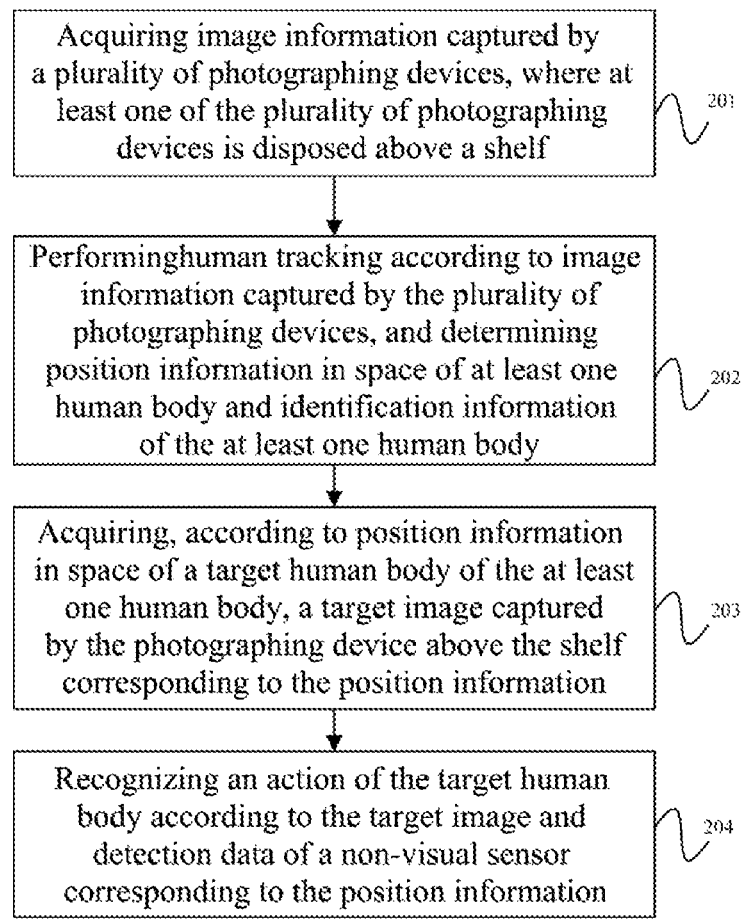
FIG. 2 is a flowchart of a method for human motion analysis according to an embodiment of the present disclosure.

FIG. 2 is a flowchart of a method for human motion analysis according to an embodiment of the present disclosure. The embodiment of the present disclosure provides a method for human motion analysis aiming at the above technical problem of the prior art, and specific steps of the method are as follows.

Step 201, acquiring image information captured by a plurality of photographing devices, where at least one of the plurality of photographing devices is disposed above a shelf.

As shown in FIG. 1, the photographing device 11, the photographing device 12, and the photographing device 13 which are disposed on the top of the store and the photographing device 14 disposed above the shelf 15 capture image information in real time, and send the captured image information to the device 16. Optionally, wired communication or wireless communication can be performed between each of the photographing devices and the device 16. In this embodiment, the photographing device may specifically be an RGB camera or an RGB-D camera. It is only a schematic illustration herein and does not limit the number and specific location of the photographing device. It can be understood that in other embodiments, the photographing device 11, the photographing device 12, and the photographing device 13 may not be disposed on the top of the store, for example, they may be disposed on a wall, a corner, or the like of the store, as long as the photographing coverage of the plurality of photographing devices may cover the store. In addition, the photographing device 14 may not be disposed above the shelf, for example, it may be disposed on the vertical beam of the shelf, as long as the photographing device 14 can capture the customer in front of the shelf, and the number of the photographing device installed on each shelf is not limited herein.

Step 202, performing human tracking according to image information captured by the plurality of photographing devices, and determining position information in space of at least one human body and identification information of the at least one human body.

After receiving the image information captured in real time by the photographing device 11, the photographing device 12, the photographing device 13, and the photographing device 14, the device 16 performs the human tracking according to the image information captured in real time by each photographing device, and determines 3D position information in space of the human body captured by each photographing device, identification information of the human body, and 2D position information of human body in the image information captured by each photographing device.

For example, images captured by the photographing device 11, the photographing device 12, the photographing device 13 and the photographing device 14 include a human body A, a human body B, and a human body C. After performing the human tracking, the device 16 determines the 3D position information in space and the identification information of the human body A, the human body B, and the human body C, as well as the 2D positions of the human body A, the human body B, and the human body C in the image captured by each photographing device, respectively.

Step 203, acquiring, according to position information in space of a target human body of the at least one human body, a target image captured by the photographing device above the shelf corresponding to the position information.

It can be understood that the human body A, the human body B and the human body C can generate various actions in the store, such as the actions of picking up a commodity and returning the commodity. The device 16 can recognize each human action, taking the human body A as an example, after determining the 3D position information in space of the human body A, the device 16 can further determine the photographing device above the shelf corresponding to the 3D position information. For example, the device 16 determines, according to the 3D position information in space of the human body A, the photographing device disposed above the shelf and closest to the human body, such as the photographing device 14, and determines the image information captured by the photographing device 14 from all the image information received from the device 16. It can be understood that the image information captured by the photographing device 14 includes the human body A. The image information captured by the photographing device 14 is recorded as the target image.

Step 204, recognizing an action of the target human body according to the target image and detection data of a non-visual sensor corresponding to the position information.

In this embodiment, the device 16 can also determine the non-visual sensor closest to the human body A according to the 3D position information in space of the human body A. Specifically, the device 16 recognizes the action of the human body A according to the image information captured by the photographing device 14 and the detection data of the non-visual sensor closest to the human body A.

Specifically, the recognizing the action of the target human body includes: recognizing an action of picking up a commodity of the target human body; and/or recognizing an action of putting down the commodity of the target human body.

For example, the device 16 recognizes the action of picking up the commodity and/or the action of putting down the commodity of the human body A according to the image information captured by the photographing device 14 and the detection data of the non-visual sensor closest to the human body A.

In the embodiment of the present disclosure, image information captured by a plurality of photographing devices is acquired, and the human tracking is performed according to the image information captured by the plurality of photographing devices, where at least one of the plurality of photographing devices is disposed above a shelf, and since the photographing device above the shelf can capture the human body in front of the shelf more completely, the accuracy of the human tracking is improved; in addition, the human action is recognized by combining the image information captured by the photographing device above the shelf and the detection data of the non-visual sensor surrounding the human body, thereby improving the precision of the human action recognition.

Figure 3:
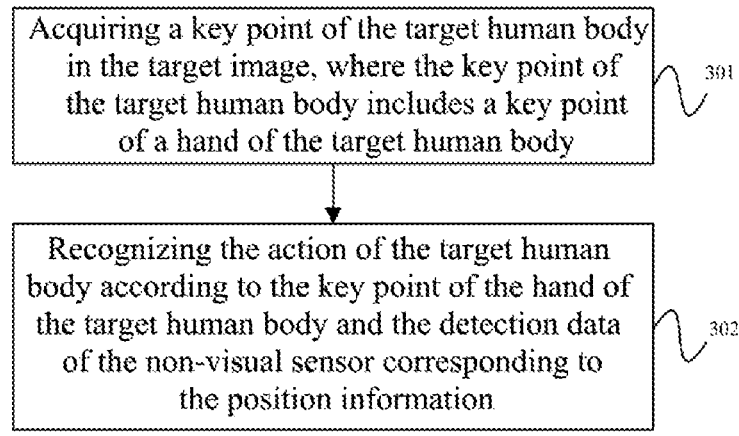
FIG. 3 is a flowchart of a method for human motion analysis according to another embodiment of the present disclosure.

FIG. 3 is a flowchart of a method for human motion analysis according to another embodiment of the present disclosure. On the basis of the above embodiment, the recognizing an action of the target human body according to the target image and detection data of a non-visual sensor corresponding to the position information specifically includes following steps:

step 301, acquiring a key point of the target human body in the target image, where the key point of the target human body includes a key point of a hand of the target human body.

For example, after receiving the target image captured by the photographing device 14, the device 16 acquires the key point of the human body A in the target image adopting a human body key point algorithm according to the 2D position information of the human body A in the target image. It can be understood that the key point of the human body A includes the key point of the soma of the human body A and the key point of the hand of the human body A, and the device 16 can establish a correlation between the human body A and the hand of the human body A according to the key point of the human body A and the key point of the hand of the human body A in the target image.

Step 302, recognizing the action of the target human body according to the key point of the hand of the target human body and the detection data of the non-visual sensor corresponding to the position information.

Specifically, the device 16 recognizes the action of the human body A according to the key point of the hand of the human body A and the detection data of the non-visual sensor closest to the human body A. It can be understood that the device 16 can receive the target image captured by the photographing device 14 in real time, and extract the key point of the hand of the human body A from the target image in real time, but the device 16 does not recognize the action of the hand of the human body A according to the key point of the hand of the human body A in real time, because the action of the hand of the human body A does not occur in real time, for example, the human body A does not pick up the commodity or put it down in real time; the human body A may observe the commodity carefully before picking it up; and the human body A will observe the commodity carefully after picking it up and will not immediately put it down. Therefore, if the action of the hand of the human body A, for example, picking up a commodity or putting it down, occurs with low frequency, and the device 16 recognizes the action of the hand of the human body A according to the key point of the hand of the human body A in real time, the amount of calculation of the device 16 will be increased. Therefore, in the present embodiment, the device 16 can recognize the action of the human body A in combination with the detection data of the non-visual sensor closest to the human body A and the key point of the hand of the human body A.

Optionally, the non-vision sensor includes a light curtain sensor which is disposed on a beam of the shelf facing the customer and configured to detect the occurrence time of the action; and the recognizing the action of the target human body according to the key point of the hand of the target human body and the detection data of the non-visual sensor corresponding to the position information includes: recognizing, according to the key point of the hand of the target human body, the action of the target human body at the occurrence time of the action detected by the light curtain sensor.

As shown in FIG. 1, the light curtain sensor 18 is disposed on the beam 17 of the shelf 15, and in particular, the light curtain sensor 18 can be strip-shaped, and the light curtain sensor 18 is disposed on the outer edge of the beam 17 facing the customer. Optionally, a plurality of light curtain sensors are disposed on the outer edge of the beam 17, and the light curtain sensor 18 is only one of them. For example, the plurality of light curtain sensors are sequentially arranged on the outer edge of the beam 17, where the position information of each light curtain sensor with respect to the beam 17 is preset.

For example, when the human body A reaches out to pick up commodity 21 or put the commodity 21 back, the hand of the human body A will pass by at least one of the plurality of light curtain sensors, such as the light curtain sensor 18, at this time the light curtain sensor 18 can send a sensing signal to the device 16. And the device 16 can determine the occurrence time of the action of the hand of the human body A according to the time when the light curtain sensor 18 sends the sensing signal, and can determine the occurrence position of the action of the hand of the human body A according to the position information of the light curtain sensor 18 with respect to the beam 17. Specifically, the device 16 recognizes the action of the hand of the human body A, such as picking up the commodity, putting it back, or other actions, according to the key point and change of the hand of the human body A at the occurrence time of the action of the hand of the human body A.

Optionally, the non-vision sensor further includes an infrared sensor which is disposed on a layer plate of the shelf; the light curtain sensor is further configured to detect an occurrence position of the action; the recognizing, according to the key point of the hand of the target human body, the action of the target human body at the occurrence time of the action detected by the light curtain sensor includes: acquiring, at the occurrence time of the action detected by the light curtain sensor, according to the occurrence position of the action detected by the light curtain sensor, a change of infrared radiation intensity of the human body and/or the commodity detected by the infrared sensor corresponding to the occurrence position of the action; and recognizing, according to the change of infrared radiation intensity of the human body and/or the commodity detected by the infrared sensor corresponding to the occurrence position of the action and the key point of the hand of the target human body, the action of the target human body.

As shown in FIG. 1, the infrared sensor 20 is disposed on the layer plate 19 of the shelf 15. It can be understood that the plurality of infrared sensors may be disposed on the layer plate 19 of the shelf 15, and the infrared sensor 20 is only one of them. The infrared sensor can be used to sense the infrared radiated by the hand of the human body A and the commodity in front of the infrared sensor. When the human body A reaches out to get the commodity 21 or puts the commodity 21 back, the intensity of the infrared radiated by the hand of the human body A detected by the infrared sensor is constantly changing, for example, when the hand of the human body A gradually approaches the commodity 21, the intensity of the infrared radiated by the hand of the human body A detected by the infrared sensor is continuously increased; and when the hand of the human body A gradually moves away from the commodity 21, the intensity of the infrared radiated by the hand of the human body A detected by the infrared sensor is continuously weakened. It can be understood that the intensity of the infrared radiated by the hand of the human body A detected by the infrared sensor closest to the hand of the human body A on the layer plate 19 is relatively accurate.

One possible way to determine the infrared sensor on the layer plate 19 closest to the hand of the human body A is: when the human body A reaches out to get the commodity 21 or put the commodity 21 back, the hand of the human body A will pass by the at least one of the plurality of light curtain sensors as described above, for example, the light curtain sensor 18, at this time the light curtain sensor 18 can send a sensing signal to the device 16. And the device 16 can determine the occurrence time of the action of the hand of the human body A according to the time at which the light curtain sensor 18 sends the sensing signal, and can determine the occurrence position of the action of the hand of the human body A according to the position information of the light curtain sensor 18 with respect to the beam 17. At this time, the device 16 can, according to the occurrence position of the action of the hand of the human body A, determine the infrared sensor closest to the occurrence position of the action of the hand of the human body A, or can determine the infrared sensor that is closest to the light curtain sensor 18, such as the infrared sensor 20. Further, the device 16 acquires intensity change of the infrared radiation of the human body and/or the commodity detected by the infrared sensor 20, and recognizes the action of the hand of the human body A, such as picking up the commodity, putting the commodity back, or other actions, by combining the intensity change of the infrared radiation of the human body and/or the commodity detected by the infrared sensor 20 with the key point and its change of the hand of the human body A in the target image captured by the photographing device 14.

Optionally, the non-visual sensor further includes a gravity sensor which is disposed on the layer plate of the shelf; the method further includes: acquiring, at the occurrence time of the action detected by the light curtain sensor, according to the occurrence position of the action detected by the light curtain sensor, a gravity change detected by a gravity sensor corresponding to the occurrence position of the action; and the recognizing the action of the human body according to the intensity change of infrared radiation of the human body and/or the commodity detected by the infrared sensor corresponding to the occurrence position of the action and the key point of the hand of the human body includes: recognizing the action of the human body according to the intensity change of infrared radiation of the human body and/or the commodity detected by the infrared sensor corresponding to the occurrence position of the action, the gravity change of detected by the gravity sensor corresponding to the occurrence position of the action, and the key point of the hand of the human body.

As shown in FIG. 1, the gravity sensor can also be disposed on the layer plate 19 of the shelf 15. It can be understood that the detection result of the gravity sensor is different when the commodities on the layer plate 19 are reduced or increased, that is, when the human body A picks up the commodity from the layer plate 19 or puts the commodity back, the detection result of the gravity sensor is different. Therefore, when the device 16 recognizes the action of the human body A, the detection result of the gravity sensor can also be referred to.

Specifically, when the human body A reaches out to get the commodity 21 or put the commodity 21 back, the hand of the human body A will pass by at least one of the plurality of light curtain sensors as described above, for example, the light curtain sensor 18, at this time the light curtain sensor 18 can send a sensing signal to the device 16. And the device 16 can determine the occurrence time of the action of the hand of the human body A according to the time at which the light curtain sensor 18 sends the sensing signal, and can determine the occurrence position of the action of the hand of the human body A according to the position information of the light curtain sensor 18 with respect to the beam 17. At this time, the device 16 can, according to the occurrence position of the action of the hand of the human body A, determine the infrared sensor closest to the occurrence position of the action of the hand of the human body A, or can determine the infrared sensor that is closest to the light curtain sensor 18, such as the infrared sensor 20, and can determine the gravity sensor closest to the occurrence position of the action of the hand of the human body A, or can determine the infrared sensor closest to the light curtain sensor 18, such as the gravity sensor. Further, the device 16 acquires the intensity change of the infrared radiation of the human body and/or the commodity detected by the infrared sensor 20, and the gravity change detected by the gravity sensor. The device 16 recognizes the action of the hand of the human body A, such as picking up the commodity, putting it back, or other actions, in combination with the intensity change of the infrared radiation of the human body and/or the commodity detected by the infrared sensor 20, the gravity change detected by the gravity sensor, and the key point and its change of the hand of the human body A in the target image captured by the photographing device 14.

In addition, after the device 16 determines the action of the hand of the human body A, it may also determine which person in the current store is performing the action according to the identification information of the human body A determined in the above human tracking process.

The embodiment of the invention recognizes the action of the human body in combination of the image information captured by the photographing device above the shelf and the detection data of the non-visual sensor surrounding the human body, thereby improving the accuracy of the human action recognition. In addition, the occurrence time of the action of the human body is determined by the detection data of the non-visual sensor, the action of the human body is recognized at the occurrence time of the action of the human body, rather than recognizing the action of the human body in real time, thus the calculation amount of the device can be reduced when the occurrence frequency of the action of the human body is low, and the resource utilization rate of the device can be improved.

Figure 4:
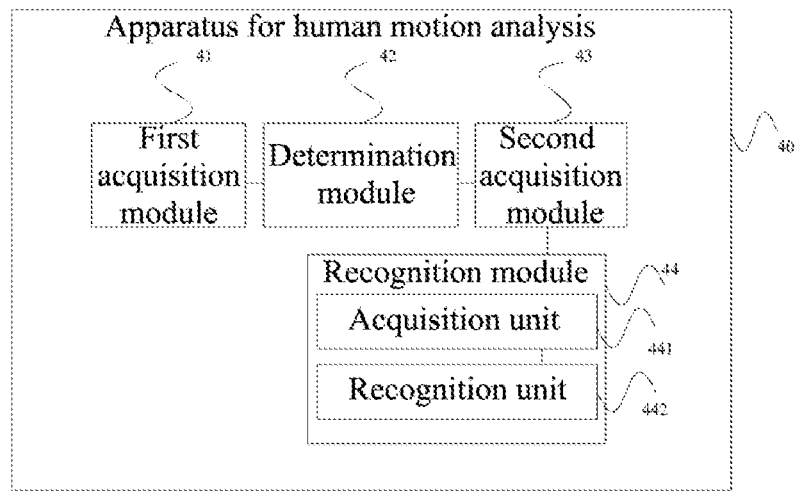
FIG. 4 is a schematic structural diagram of an apparatus for human motion analysis according to an embodiment of the present disclosure.

FIG. 4 is a schematic structural diagram of an apparatus for human motion analysis according to an embodiment of the present disclosure. The apparatus for human motion analysis may specifically be the device 16 of the above embodiment, or a component of the device 16. The apparatus for human motion analysis according to the embodiment of the present disclosure can perform the processing flow according to the embodiment of the method for human motion analysis. As shown in FIG. 4, the apparatus for human motion analysis 40 includes: a first acquisition module 41, a determination module 42, a second acquisition module 43, and a recognition module 44, where the first acquisition module 41 is configured to acquire image information captured by a plurality of photographing devices, and at least one of the plurality of photographing devices is disposed above the shelf; the determination module 42 is configured to perform human tracking according to the image information captured by the plurality of photographing devices and determine the position information in space of at least one human body and identification information of the at least one human body; the second acquisition module 43 is configured to acquire a target image captured by the photographing device above the shelf corresponding to the position information according to the position information in space of a target human body in the at least one human body; and the recognition module 44 is configured to recognize the action of the target human body according to the target image and the detection data of the non-visual sensor corresponding to the position information.

Optionally, the recognition module 44 includes an acquisition unit 441 and an recognition unit 442; the acquisition unit 441 is configured to acquire a key point of the target human body in the target image, where the key point of the target human body includes a key point of a hand of the target human body; and the recognition unit 442 is configured to recognize the action of the target human body according to the key point of the hand of the target human body and the detection data of the non-visual sensor corresponding to the position information.

Optionally, the non-visual sensor comprises a light curtain sensor, the light curtain sensor is disposed on the beam of the shelf facing the customer, and the light curtain sensor is configured to detect an occurrence time of the action; and the recognition unit 442 is specifically configured to: recognize the action of the target human body at the occurrence time of the action detected by the light curtain sensor according to the key point of the hand of the target human body.

Optionally, the non-vision sensor further includes an infrared sensor which is disposed on a layer plate of the shelf; the light curtain sensor is further configured to detect an occurrence position of the action; and the acquisition unit 441 is further configured to: acquire, at the occurrence time of the action detected by the light curtain sensor, according to the occurrence position of the action detected by the light curtain sensor, an intensity change of the infrared radiation of the human body and/or the commodity detected by the infrared sensor corresponding to the occurrence position of the action; and the recognition unit 442 is specifically configured to: recognize, according to the intensity change of the infrared radiation of the human body and/or the commodity detected by the infrared sensor corresponding to the occurrence position of the action and the key point of the hand of the target human body, the action of the target human body.

Optionally, the non-vision sensor further includes a gravity sensor which is disposed on the layer plate of the shelf; the acquisition unit 441 is further configured to: acquire, according to the occurrence position of the action detected by the light curtain sensor, a gravity change detected by a gravity sensor corresponding to the occurrence position of the action at the occurrence time of the action detected by the light curtain sensor; and the recognition unit 442 is specifically configured to: recognize the action of the target human body according to the intensity change of infrared radiation of the human body and/or the commodity detected by the infrared sensor corresponding to the occurrence position of the action, the gravity change detected by the gravity sensor corresponding to the occurrence position of the action, and the key point of the hand of the target human body.

Optionally, the recognition module 44 is specifically configured to: recognize an action of picking up the commodity of the target human body; and/or recognize an action of putting down the commodity product of the target human body.

The apparatus for human motion analysis of the embodiment shown in FIG. 4 can be used to implement the technical solution of the above method embodiment, and the implementation principle and the technical effect thereof are similar, which will not be repeated herein.

Figure 5:
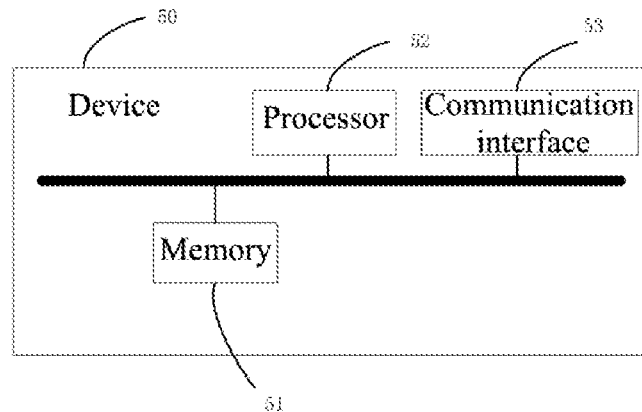
FIG. 5 is a schematic structural diagram of a device according to an embodiment of the present disclosure.

FIG. 5 is a schematic structural diagram of a device according to an embodiment of the present disclosure. The device can be a terminal device or a server. The device according to the embodiment of the present disclosure may perform the processing flow according to the embodiment of the method for human motion analysis. As shown in FIG. 5, a device 50 includes a memory 51, a processor 52, a computer program, and a communication interface 53, where the computer program is stored in the memory 51, and is configured to be executed by the processor 52 perform the method for human motion analysis described in the above embodiments.

The device of the embodiment shown in FIG. 5 can be used to perform the technical solutions of the above method embodiment, and the implementation principle and the technical effect thereof are similar, which will not be repeated herein.

In addition, this embodiment further provides a computer readable storage medium having a computer program stored thereon, where the computer program, when executed by the processor, implements the method for human motion analysis described in the above embodiments.

In the several embodiments according to the present disclosure, it should be understood that the disclosed apparatuses and methods may be implemented in other manners. For example, the apparatus embodiments described above are merely illustrative. For example, the division of the unit is only a logical function division, and there may be other division manners in actual implementation; for example, multiple units or components may be combined or may be integrated into another system, or some features can be ignored or not be executed. In addition, the mutual coupling or direct coupling or communication connection shown or discussed may be an indirect coupling or communication connection through some interfaces, apparatuses or units, and may be in electrical, mechanical or other forms.

The units described as a separate component may or may not be physically separated, and the components displayed as units may or may not be physical units, that is, may be located in one place, or may be distributed to multiple network units. Some or all of the units may be selected as required to achieve the purpose of the solutions of the embodiments.

In addition, each functional unit in each embodiment of the present disclosure may be integrated into one processing unit, or each unit may exist physically separately, or two or more units may be integrated into one unit. The above integrated unit can be implemented in the form of hardware or in the form of hardware plus software functional units.

The above integrated unit implemented in the form of a software functional unit can be stored in a computer readable storage medium. The above software functional unit stored in a storage medium includes some instructions for causing a computer device (may be a personal computer, a server, or a network device, etc.) or a processor to perform part of the steps of the methods of each embodiment of the present disclosure. The above storage medium includes: a U disk, a mobile hard disk, a read-only memory (ROM), a random access memory (RAM), a magnetic disk, or an optical disk, and the like, which can store program codes.

Those skilled in the art can clearly understand that, for convenience and brevity of the description, only the division of each functional module described above is illustrated with examples. In practical applications, the above functions can be assigned to different functional modules as needed for completion, that is, the internal structure of the apparatus is divided into different functional modules to perform all or part of the functions described above. The specific working process of the apparatus described above may refer to the corresponding processes in the foregoing method embodiments, which will not be repeated herein.

Finally, it should be noted that the above embodiments are merely illustrative of the technical solutions of the present disclosure, and are not to be taken in a limiting sense; although the present disclosure has been described in detail with reference to the above embodiments, those skilled in the art will understand that they may still modify the technical solutions described in the above embodiments, or equivalently substitute some or all of the technical features; and the modifications or substitutions do not deviate the essence of the corresponding technical solutions from the scope of the technical solutions of each embodiment of the present disclosure.

What is claimed is:

1. A method for human motion analysis, comprising:
   acquiring image information captured by a plurality of photographing devices, wherein at least one of the plurality of photographing devices is disposed above a shelf;
   performing human tracking according to the image information captured by the plurality of photographing devices, and determining position information in space of at least one human body and identification information of the at least one human body;
   acquiring, according to the position information in space of a target human body of the at least one human body, a target image captured by the photographing device above a shelf corresponding to the position information;
   acquiring a key point of the target human body in the target image, wherein the key point of the target human body comprises a key point of a hand of the target human body; and
   recognizing an action of the target human body according to the key point of the hand of the target human body and detection data of a non-visual sensor corresponding to the position information;
   wherein the non-visual sensor comprises a light curtain sensor which is disposed on a beam of the shelf facing a customer and used to detect an occurrence time of the action and an occurrence position of the action, and an infrared sensor that is disposed on a layer plate of the shelf; and
   the recognizing an action of the target human body according to the key point of the hand of the target human body and detection data of a non-visual sensor corresponding to the position information comprises:
   acquiring, according to the occurrence position of the action detected by the light curtain sensor, an intensity change of infrared radiation of a commodity detected by the infrared sensor corresponding to the occurrence position of the action at the occurrence time of the action detected by the light curtain sensor; and
   recognizing, according to the intensity change of infrared radiation of the commodity detected by the infrared sensor corresponding to the occurrence position of the action and the key point of the hand of the target human body, the action of the target human body.

2. The method according to claim 1, wherein the recognizing an action of the target human body comprises:
   recognizing an action of picking up a commodity of the target human body.

3. An apparatus for human motion analysis, comprising: a processor and a non-transitory computer-readable medium for storing program codes, which, when executed by the processor, cause the processor to:
   acquire image information captured by a plurality of photographing devices, wherein at least one of the plurality of photographing devices is disposed above a shelf;
   perform human tracking according to the image information captured by the plurality of photographing devices, and determine position information in space of at least one human body and identification information of the at least one human body;
   acquire, according to the position information in space of a target human body of the at least one human body, a target image captured by the photographing device above a shelf corresponding to the position information;
   acquire a key point of the target human body in the target image, wherein the key point of the target human body comprises a key point of a hand of the target human body; and
   recognize an action of the target human body according to the key point of the hand of the target human body and detection data of a non-visual sensor corresponding to the position information;
   wherein the non-visual sensor comprises a light curtain sensor which is disposed on a beam of the shelf facing a customer and used to detect an occurrence time of the action and an occurrence position of the action, and an infrared sensor that is disposed on a layer plate of the shelf; and the program codes further cause the processor to:

acquire, according to the occurrence position of the action detected by the light curtain sensor, an intensity change of infrared radiation of a commodity detected by the infrared sensor corresponding to the occurrence position of the action at the occurrence time of the action detected by the light curtain sensor; and recognize, according to the intensity change of infrared radiation of the commodity detected by the infrared sensor corresponding to the occurrence position of the action and the key point of the hand of the target human body, the action of the target human body.

4. The apparatus according to claim 3, wherein the program codes further cause the processor to:

recognize an action of picking up a commodity of the target human body.

5. The method of claim 1, wherein the human motion analysis is performed by a device comprising:
  a memory;
  a processor; and
  a computer program;
  wherein the computer program is stored in the memory and is configured to be executed by the processor.

6. A non-transitory computer readable storage medium, having a computer program stored thereon, wherein the computer program, when executed by a processor, implements the method according to claim 1.

7. The method according to claim 1, wherein the non-vision sensor further comprises a gravity sensor that is disposed on the layer plate of the shelf;

the method further comprises:

acquiring, according to the occurrence position of the action detected by the light curtain sensor, a gravity change detected by the gravity sensor corresponding to the occurrence position of the action at the occurrence time of the action detected by the light curtain sensor; and the recognizing, according to the intensity change of infrared radiation of the commodity detected by the infrared sensor corresponding to the occurrence position of the action and the key point of the hand of the target human body, the action of the target human body comprises:

recognizing, according to the intensity change of infrared radiation of the commodity detected by the infrared sensor corresponding to the occurrence position of the action, the gravity change detected by the gravity sensor corresponding to the occurrence position of the action, and the key point of the hand of the target human body, the action of the target human body.

8. The method according to claim 1, wherein the recognizing an action of the target human body comprises:

recognizing an action of putting down a commodity of the target human body.

9. The apparatus according to claim 3, wherein the non-vision sensor further comprises a gravity sensor that is disposed on the layer plate of the shelf;

the program codes further cause the processor to:

acquire, according to the occurrence position of the action detected by the light curtain sensor, a gravity change detected by the gravity sensor corresponding to the occurrence position of the action at the occurrence time of the action detected by the light curtain sensor; and recognize, according to the intensity change of infrared radiation of the commodity detected by the infrared sensor corresponding to the occurrence position of the action, the gravity change detected by the gravity sensor corresponding to the occurrence position of the action, and the key point of the hand of the target human body, the action of the target human body.

10. The apparatus according to claim 3, wherein the program codes further cause the processor to:

recognize an action of putting down the commodity of the target human body.

* * * * *